(12) United States Patent
Fukuda et al.

(10) Patent No.: US 6,398,356 B1
(45) Date of Patent: Jun. 4, 2002

(54) RECORDING LIQUID AND IMAGE RECORDING METHOD

(75) Inventors: Yuzuru Fukuda; Takeshi Mikami; Jiro Minabe, all of Ashigara; Yasufumi Suwabe, Ashigarakami-gun, all of (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/497,473

(22) Filed: Feb. 4, 2000

Related U.S. Application Data

(62) Division of application No. 08/925,391, filed on Sep. 8, 1997, now Pat. No. 6,075,085.

(30) Foreign Application Priority Data

Sep. 12, 1996 (JP) ............................................. 8-242395
Sep. 12, 1996 (JP) ............................................. 8-265308

(51) Int. Cl.$^7$ ................................................ G01D 11/00
(52) U.S. Cl. ........................ 347/100; 347/101; 347/96
(58) Field of Search ................................. 347/100, 101, 347/105, 99, 96, 95

(56) References Cited

U.S. PATENT DOCUMENTS

| | | | |
|---|---|---|---|
| 2,681,324 A | | 6/1954 | Hochberg |
| 4,007,147 A | | 2/1977 | Leeson et al. |
| 5,039,339 A | * | 8/1991 | Phan et al. ................. 347/100 |
| 5,204,404 A | * | 4/1993 | Werner, Jr. et al. ......... 524/501 |
| 5,660,623 A | * | 8/1997 | Macpherson et al. ....... 106/493 |
| 5,712,340 A | | 1/1998 | Gyotoku et al. |
| 5,748,208 A | * | 5/1998 | Uchiyama et al. .......... 347/100 |
| 5,817,419 A | | 10/1998 | Fryd et al. |
| 6,075,070 A | * | 6/2000 | Lin et al. ................. 106/31.27 |

FOREIGN PATENT DOCUMENTS

| | | | | |
|---|---|---|---|---|
| JP | B2 60-32663 | | 7/1985 | |
| JP | A 5-239392 | | 9/1993 | |
| JP | A 5-255628 | | 10/1993 | |
| JP | A 6-340835 | | 12/1994 | |
| JP | B2 7-47355 | | 5/1995 | |
| JP | 10017801 | * | 1/1998 | ........... C09D/11/00 |

* cited by examiner

*Primary Examiner*—John Barlow
*Assistant Examiner*—Manish S. Shah
(74) *Attorney, Agent, or Firm*—Oliff & Berridge, PLC

(57) ABSTRACT

A recording liquid including a colorant, water and at least two kinds of fine resin particles. In a preferred embodiment, at least one of the two kinds of the fine resin particles are fine self-crosslinkable resin particles. In another preferred embodiment, the number of the kinds of the fine resin particles is 3 or more. Also, disclosed is an image recording method using the recording liquid.

16 Claims, No Drawings

RECORDING LIQUID AND IMAGE RECORDING METHOD

This appl. is a divisional of U.S. appl. Ser. No. 08/925,391, filed Sep. 8, 1997 now U.S. Pat. No. 6,075,085.

FIELD OF THE INVENTION

The present invention relates to a recording liquid and an image recording method, and more particularly to a recording liquid comprising a colorant, water and fine resin particles, and an image recording method using the same.

BACKGROUND OF THE INVENTION

Recently, attentions have been paid to ink jet systems, i.e., image recording methods in which droplets of recording liquids are discharged from recording heads to record images on recording media, because the running cost thereof is low and this system can be easily applied to color image system for output devices of information instruments such as computers. As recording liquids for ink jet printers, aqueous solutions of dyes which are mainly composed of water and dyes have hitherto been used. However, there is the problem that when recording liquids jetted from nozzles adhere to recording paper, they blurred on the recording paper so that the resulting dot images become extremely larger droplets formed by jetting, or have low image density, to thereby result in low image quality. Further, there is the problem that the images are easily blurred or flow with water, because of low water resistance of the recorded images. Furthermore, there is the problem that the images are easily faded by irradiation of light such as sunlight, because of low light resistance.

As to recording liquids for ink jet printers, techniques have been proposed in which film-forming fine resin particles are added to recording liquids to solve the above described problems of the aqueous solutions of dyes. For example, JP-B-60-32663 (the term "JP-B" as used herein means an "examined Japanese patent publication") discloses a recording liquid to which a latex is added as the fine resin particles, JP-A-5-239392 (the term "JP-A" as used herein means an "unexamined published Japanese patent application) discloses a recording liquid to which a water-dispersible resin having carboxyl and nonionic hydrophilic groups is added, JP-A-5-255628 discloses a recording liquid to which a vinyl polymer of a non-crosslinked structure, and JP-A-6-340835 discloses a recording liquid to which polyester particles having ionic groups are added. Further, JP-B-7-47355 discloses a technique which comprises adding particles of a resin such as a polyester and a crosslinking agent to a recording liquid, and crosslinking the resin on a recording medium.

However, in all of the recording liquids disclosed in the above described patents, film formation of the fine resin particles is initiated at discharge outlet sections of recording heads as water contained in the recording liquids is evaporated by contacting with air. This results in occurrence of clogging. It has been therefore impossible to stably discharge the recording liquids. Further, according to these recording liquids, it has been impossible to completely prevent the recording liquids from blurring in fibers of recording paper by capillary action, to thereby fail to provide images of high image quality. Furthermore, it has been impossible to completely prevent these recording liquids from penetrating into the inside of the recording paper, which imposes a limitation on the acquisition of images of high density and high image quality. Similarly, there is also a limitation on water resistance. Moreover, the dilution of the above described conventional recording liquids with water for avoiding the clogging at discharge outlets decreases the content of fine resin particles contained in the same volume of droplets, namely the content of resin solids contributing to image formation, as compared to that prior to the dilution, which causes a remarkable reduction in image density. It has been therefore impossible to provide images of high image quality. That is, in the conventional recording liquids, the provision of images having a high image density and high image quality by increasing the content of fine resin particles (the content of resin solids) has been incompatible with the avoidance of the clogging at discharge outlets.

SUMMARY OF THE INVENTION

The present invention has been made for solving the above described problems, and an object of the present invention is to provide a recording liquid which can provide an image having a high image density, exhibiting no blurring on recording paper and no penetration therein, and having excellent water resistance, and which is excellent in discharge stability.

Another object of the present invention is to provide an image recording method using the recording liquid.

Other objects and effects of the present invention will become apparent from the following description.

The above described objects of the present invention has been achieved by providing a recording liquid comprising a colorant, water and at least two kinds of fine resin particles.

In a first preferred embodiment, the recording liquid comprises a colorant, water and at least two kinds of fine resin particles, wherein at least one kind of the at least two kinds of fine resin particles are fine self-crosslinkable resin particles.

In a second preferred embodiment, the recording liquid comprises a colorant, water and at least three kinds of fine resin particles.

The present invention also relates to an image recording method comprising discharging droplets of the above described recording liquid from a recording head to record an image on a recording medium.

DETAILED DESCRIPTION OF THE INVENTION

The reason why the recording liquids as described above allows the attainment of high image density by increasing the content of fine resin particles (the content of resin solids) to be compatible with the avoidance of the clogging at a discharge outlet of a recording head is not fully clarified, but inferred as follows.

The inclusion of at least two different kinds of fine resin particles in the recording liquid decreases the probability that around (at proximate coordinate positions) a certain fine resin particle is present a fine resin particle of the same kind as this fine resin particle. This decreases the probability that the fine resin particles of the same kind come close to and collide with each other, which inhibits a series of processes from the approach of the fine resin particles of the same kind to each other to film formation through their collision and fusion (coordination effect), resulting in prevention of clogging.

Similarly, the inclusion of at least three different kinds of fine resin particles in the recording liquid decreases the probability that around (at proximate coordinate positions) a certain fine resin particle is present a fine resin particle of the same kind as the fine resin particle to one third or less. This decreases the probability that the fine resin particles of the same kind come close to and collide with each other, which inhibits a series of processes from the approach of the fine resin particles of the same kind to each other to film formation through their collision and fusion (coordination effect), resulting in prevention of clogging.

Further, the attraction between particles becomes more difficult to act when different kinds of fine resin particles are present in the recording liquid than when only fine resin particles of the same kind are present (the repulsion becomes easy to act). Accordingly, fine resin particles of the same kind are prevented from coming close to each other, and the probability of their collision is decreased (the effect of repulsion between particles). Similar to the above, therefore, a series of processes from the approach of the fine resin particles of the same kind to each other to film formation through their collision and fusion is inhibited, resulting in prevention of the clogging.

Furthermore, with respect to the prevention of the clogging, it is considered that the differences in particle size and form between the different kinds of fine resin particles are larger than those between the fine resin particles of the same kind. When around a certain fine resin particle is present a different kind of fine resin particle largely different therefrom in particle size and form, the fine resin particles of the same kind and the different kinds are prevented from coming close to each other (geometrical structure effect), thereby also possibly preventing the clogging as similar to the above.

In the present invention, the fine resin particles are remarkably prevented from coming close to each other by the sum of the above described effects, so that the total content of the fine resin particles contained in the recording liquid can be increased. The content of the fine resin particles in one droplet can also be increased as well which makes it possible to form images of high image density.

In addition, images can be rapidly formed on the recording paper by the high-speed film-forming property of fine self-crosslinkable resin particles contained in the recording liquid. That is, the crosslinking reaction of the fine self-crosslinkable resin particles proceeds at high speed with evaporation of water contained in droplets of the recording liquid and penetration of the recording liquid in the paper from immediately after adhesion of the droplets of the recording liquid jetted from the recording head to the recording paper, thereby rapidly forming a firm image film in which the colorant is enclosed in the resin. At this time, in the first preferred embodiment, the film formation of other coexistent fine self-crosslinkable resin particles and fine resin particles other than the fine self-crosslinkable resin particles also proceeds. In the second preferred embodiment, the film formation of the three or more kinds of fine resin particles proceeds side by side. This prevents the recording liquid from blurring and penetrating. Thus, it becomes possible to form images comprising resins and a colorant enclosed therein, and having a high image density and high water resistance, on the recording medium such as paper.

The present invention is described in detail below.

The recording liquid of the first preferred embodiment of the present invention comprises a colorant, water and at least two kinds of fine resin particles in which fine resin particles of at least one kind are fine self-crosslinkable resin particles.

The term "self-crosslinkable resin" as used in the present invention means a resin which crosslinks by the reactivity of functional groups incorporated into a main chain and/or side chains of the resin, not by the action of a crosslinking agent. Examples of such fine self-crosslinkable resin particles include fine acrylsilicone resin particles and fine acrylamide resin particles. Of these, fine acrylsilicone resin particles containing an alkoxysilyl group are preferred which can rapidly form firm siloxane crosslinked films with colorants enclosed therein, from the viewpoints of the high-speed film-forming property suitable for rapid image formation and the strength of the formed films. In the alkoxysilyl group of the fine alkoxysilyl group-containing acrylsilicone resin particles, the alkyl group is preferably alkyl having 1 to 3 carbon atoms, and more preferably alkyl having 1 or 2 carbon atoms. The acrylic skeletons include, for example, polymers and copolymers of styrene, vinyltoluene, methyl methacrylate, ethyl methacrylate, n-butyl methacrylate, isobutyl methacrylate, 2-ethylhexyl methacrylate, vinyl acetate, acrylonitrile, methyl acrylate, ethyl acrylate, n-butyl acrylate, 2-ethylhexyl acrylate, methacrylic acid, acrylic acid, 2-hydroxyethyl methacrylate, hydroxypropyl methacrylate, 2-hydroxyethyl acrylate, acrylamide, N-methylolacrylamide and glycidyl methacrylate.

The fine resin particles which can be used together with the above described fine self-crosslinkable resin particles include fine non-crosslinkable resin particles and fine resin particles crosslinkable by the action of crosslinking agents. Specifically, they include fine fluororesin particles, fine acrylic resin particles, fine polyester resin particles, fine vinyl acetate resin particles, fine vinyl chloride resin particles, fine styrene-butadiene copolymer resin particles, fine polyurethane resin particles, fine polystyrene resin particles, fine vinyl acetate-acrylic copolymer resin particles, vinyl acetate-acrylamide copolymer resin particles, ethylene-vinyl acetate copolymer resin particles, fine epoxy resin particles, fine polyamide resin particles and fine silicone resin particles.

In this embodiment, the fine resin particles contained in the recording liquids may be composed of the fine self-crosslinkable resin particles, or the fine self-crosslinkable resin particles and the fine non-crosslinkable resin particles and/or the fine resin particles crosslinkable by the action of crosslinking agents. However, the fine resin particles are preferably composed of the fine self-crosslinkable resin particles and the fine non-crosslinkable resin particles, from the viewpoint of making it difficult to form films by the time difference between film formation processes of the respective resins and by the composition difference, to thereby prevent clogging, namely, film formation at discharge outlets of recording heads. Of the fine non-crosslinkable resin particles enumerated, fine fluororesin particles are preferred, because they are excellent in the film-forming property (image forming property), have high water repellency, high water resistance and high weather resistance, and are useful for forming images having high water resistance and a high image density. As the fine fluororesin particles, fine fluororesin particles having fluoroolefin units are preferred. Fine fluorine-containing vinyl ether resin particles composed of fluoroolefin units and vinyl ether units are particularly preferred among others.

Examples of the fluoroolefin units include —$CF_2CF_2$—, —$CF_2CF(CF_3)$— and —$CF_2CFCl$—. On the other hand, examples of the vinyl ether units include those shown below.

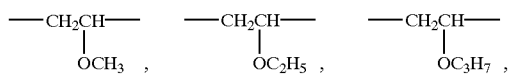

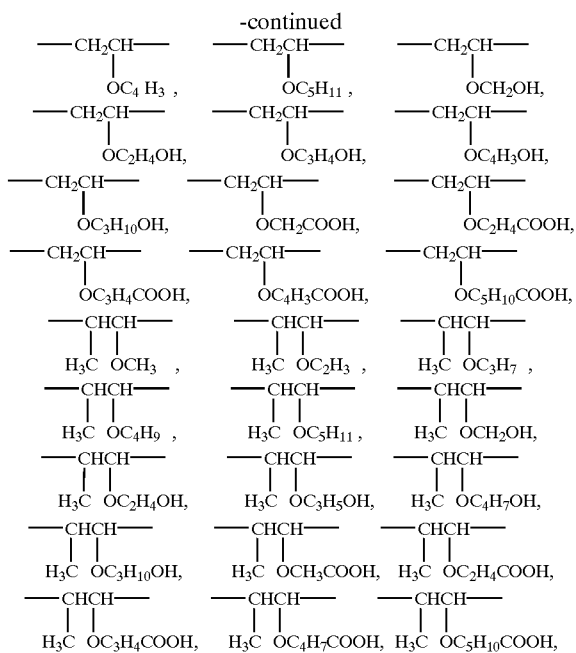

As the fine fluorine-containing vinyl ether resin particles composed of fluoroolefin units and vinyl ether units, alternating copolymers are preferred in which the above described fluoroolefin units and vinyl ether units are alternately combined.

The recording liquid according to the first preferred embodiment of the present invention contains at least two kinds of fine resin particles including fine self-crosslinkable resin particles. This sufficiently allows the attainment of high image density and high image quality by the increase of the resin solids content to be compatible with the avoidance of clogging. However, when the recording liquid contains three or more kinds of fine resin particles including fine self-crosslinkable resin particles, the above described probability that fine resin particles of the same kind are present at proximate coordinate positions is further decreased (enhancement of the coordination effect), and the attraction between particles becomes more difficult to act. Accordingly, the clogging can be more effectively prevented. There is no particular limitation on the upper limit with respect to the number of the kinds of fine resin particles contained in the recording liquid. However, when it is assumed that the shape and size of each fine resin particle are constant and that the shape is spherical, the proximate particle number (coordinate number) in the state where the particles are filled most densely, namely the number of particles existing in contact with a certain particle, amounts 12. Accordingly, the optimum value of the upper limit number of the kinds of fine resin particles is considered to be 12. Further considering the width of probabilistic deviation, the upper limit number of the kinds of fine resin particles is preferably 18 (12 kinds +6 kinds). From the above, the number of the kinds of fine resin particles contained in the recording liquid according to the first preferred embodiment of the present invention is preferably 2 to 18, and more preferably 3 to 12, from the viewpoints of the approach of the fine resin particles of the same kind to each other by the coordination effect and a decrease in collision probability. In the present invention, fine resin particles different in at least one of the characteristics of the fine resin particles or a dispersion thereof, namely, lowest film-forming temperature, glass transition temperature, ionicity, pH, weight average molecular weight and average particle size, caused by the difference in a modifying method, are considered to fine resin particles of another kind, even if the resin is composed of the same monomer.

The average particle size of the respective fine resin particles for use in the first preferred embodiment of the present invention is preferably 0.01 μm to 5 μm, and more preferably 0.05 μm to 3 μm. The fine resin particles having an average particle size of less than 0.01 μm are deteriorated in the film-forming property, whereas exceeding 5 μm results in lowered optical density (image density).

In the first preferred embodiment of the present invention, the total content of the fine resin particles (the total of the resin solid content) is preferably 10 to 95% by weight, more preferably 15 to 90% by weight, and most preferably 20 to 80% by weight, based on the weight of the recording liquid. The fine resin particles having a total content of less than 10% by weight are lowered in image optical density, whereas exceeding 95% by weight raises a fear of lowered discharge stability. Further, when two kinds of fine resin particles are used, the content of the fine self-crosslinkable resin particles contained in the recording liquid preferably ranges from 0.05 W parts by weight to 0.9 W parts by weight, taking the total solid content of the fine resin particles as W parts by weight. Furthermore, when three or more kinds of fine resin particles are used, the content of the respective fine resin particles contained in the recording liquid can be appropriately selected so as to realize desired characteristics at maximum. When n kinds (n: a positive integer of 3 or more) of fine resin particles are mixed, the solid content of the respective fine resin particles contained in the recording liquid is preferably within the range of 0.1 W/n parts by weight to 2 W/n parts by weight, taking the total solid content of the fine resin particles contained in the recording liquid as W parts by weight. If the content is less or more than this range, the effect of preventing the clogging by coexistence of two or more different kinds of fine resin particles may be reduced. Furthermore, of the fine resin particles contained in the recording liquid, the content of the fine self-crosslinkable resin particles is preferably within the range of 0.1 W/n parts by weight to 2 W/n parts by weight as similar to the above, and more preferably 0.4 W/n parts by weight to 2 W/n parts by weight, per one kind thereof. If the content is more than 2 W/n parts by weight, the effect of preventing the clogging by coexistence of two or more different kinds of fine resin particles is reduced as described above. On the other hand, if the content is less than 0.4 W/n parts by weight, the image formation speed on paper is decreased to arise a fear of lowered image density.

In the second preferred embodiment, the recording liquid of the present invention comprises a colorant, water and at least three kinds of fine resin particles.

The fine resin particles for use in the second embodiment of the present invention include fine non-crosslinkable resin particles, fine self-crosslinkable resin particles and fine resin particles crosslinkable by the action of crosslinking agents. Specifically, fine resin particles such as fine fluorine resin particles, fine polyester resin particles, fine vinyl acetate resin particles, fine vinyl chloride resin particles, fine styrene-butadiene copolymer resin particles, fine polyurethane resin particles, fine polystyrene resin particles, fine vinyl acetate-acrylic copolymer resin particles, vinyl acetate-acrylamide copolymer resin particles, ethylene-vinyl acetate copolymer resin particles, fine epoxy resin particles, fine polyamide resin particles, fine silicone resin particles, fine acrylic resin particles and fine acrylsilicone resin particles can be used. The term "self-crosslinkable resin" as used in the present invention means a resin which crosslinks by the reactivity of functional groups incorporated into a main chain and/or side chains of the resin, not by the action of a crosslinking agent.

In the second embodiment of the present invention, of the three or more kinds of fine resin particles contained in the recording liquid, at least one kind of fine resin particles are preferably the fine non-crosslinkable resin particles, from the viewpoint of making it difficult to form films by the time difference between film formation processes of the respective resins and by the composition difference, to thereby prevent clogging, namely, film formation at discharge outlets of recording heads. Of the fine non-crosslinkable resin particles enumerated, fine fluorine resin particles are preferred, because they are excellent in the film-forming property (image forming property), have high water repellency, high water resistance and high weather resistance, and are useful for forming images having high water resistance and a high image density. As the fine fluororesin particles, fine fluororesin particles having fluoroolefin units are preferred. Fine fluorine-containing vinyl ether resin particles composed of fluoroolefin units and vinyl ether units are particularly preferred among others.

Examples of the fluoroolefin units include —$CF_2CF_2$—, —$CF_2CF(CF_3)$— and —$CF_2CFCl$—. On the other hand, examples of the vinyl ether units include those shown below:

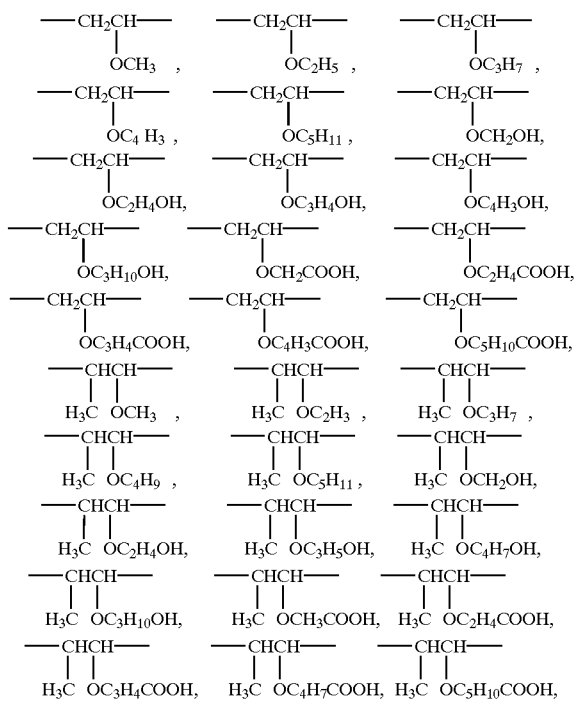

As the fine fluorine-containing vinyl ether resin particles composed of fluoroolefin units and vinyl ether units alternating copolymers are preferred in which the above described fluoroolefin units and vinyl ether units are alternately combined.

The recording liquid according to the second preferred embodiment of the present invention contains at least three kinds of fine resin particles. This sufficiently allows the attainment of high image density and high image quality by the increase of the content of resin solids to be compatible with the avoidance of clogging. However, when the recording liquid contains four or more kinds of fine resin. particles, the probability that fine resin particles of the same kind are present at the above described proximate coordinate positions is further decreased (enhancement of the coordination effect), and the attraction between particles becomes more difficult to act. Accordingly, the clogging can be more effectively prevented. There is no particular limitation on the upper limit with respect to the number of the kinds of fine resin particles contained in the recording liquid. However, when it is assumed that the shape and size of each fine resin particle are constant and that the shape is spherical, the proximate particle number (coordinate number) in the state where the particles are filled most densely, namely the number of particles existing in contact with a certain particle, amounts 12. Accordingly, the optimum value of the upper limit number of the kinds of fine resin particles is considered to be 12. Further considering the width of probabilistic deviation, the upper limit number of the kinds of fine resin particles is preferably 18 (12 kinds+6 kinds). From the above, the number of the kinds of fine resin particles contained in the recording liquid according to the second preferred embodiment of the present invention is preferably 3 to 18, and more preferably 4 to 12, from the viewpoints of the approach of the fine resin particles of the same kind to each other by the coordination effect and a decrease in collision probability. In the present invention, fine resin particles different in at least one of the characteristics of the fine resin particles or a dispersion thereof, namely, lowest film-forming temperature, glass transition temperature, ionicity, pH, weight average molecular weight and average particle size, caused by the difference in a modifying method, are considered to fine resin particles of another kind, even if the resin is composed of the same monomer.

The average particle size of the respective fine resin particles for use in the second preferred embodiment of the present invention is preferably 0.01 μm to 5 μm, and more preferably 0.05 μm to 3 μm. The fine resin particles having an average particle size of less than 0.01 μm are deteriorated in the film-forming property, whereas exceeding 5 μm results in lowered optical density (image density).

In the second preferred embodiment of the present invention, the total content of the fine resin particles (the total of the resin solid content) is preferably 10 to 95% by weight, more preferably 15 to 90% by weight, and most preferably 20 to 80% by weight, based on the weight of the recording liquid. The fine resin particles having a total content of less than 10% by weight are lowered in image optical density, whereas exceeding 95% by weight raises a fear of lowered discharge stability. Further, the content of the respective fine resin particles contained in the recording liquid can be appropriately selected so as to realize desired characteristics at maximum. When n kinds (n: a positive integer of 3 or more) of fine resin particles are mixed, the solid content of the respective fine resin particles contained in the recording liquid is preferably within the range of 0.1 W/n parts by weight to 2 W/n parts by weight, taking the total solid content of the fine resin particles contained in the recording liquid as W parts by weight. If the content is less or more than this range, the effect of preventing clogging by coexistence of three or more different kinds of fine resin particles may be reduced. Further, of the fine resin particles contained in the recording liquid, the content of the fine non-crosslinkable resin particles is preferably within the range of 0.1 W/n parts by weight to 2 W/n parts by weight as similar to the above, and more preferably 0.3 W/n parts by weight to 2 W/n parts by weight, per one kind thereof. If the content is more than 2 W/n parts by weight, the effect of preventing clogging by coexistence of three or more different kinds of fine resin particles is reduced as described above. On the other hand, if the content is less than 0.3 W/n parts by weight, there is a fear of reduced water resistance, as well as lowered clogging prevention effect.

In the present invention, the colorant preferably has a good affinity for water, i.e., a main solvent in the recording liquids of the present invention, or has a good uniform dispersibility. Specifically, pigments, water-soluble dyes and disperse dyes are used.

The pigments for use in the present invention include organic dyes and inorganic dyes. Examples of the pigments for black-and-white images include carbon black (C. I. Pigment Black 7) such as furnace black and channel black, and organic pigments such as aniline black (C. I. Pigment Black 1). Further, the pigments for color images include pigments such as C. I. Pigment Yellows 1, 3, 12, 13, 14, 17, 24, 34, 35, 37, 42, 53, 55, 81, 83, 95, 97, 98, 100, 101, 104, 108, 109, 110, 117, 120, 138 and 153, C. I. Pigment Violets 1, 3, 5:1, 16, 19, 23 and 38, and C. I. Pigment Blues 1, 2, 15, 15:1, 15:2, 15:3, 15:4, 15:6 and 16. The content of the pigments contained in the recording liquid is preferably 1 to 50% by weight, and more preferably 1.5 to 40% by weight. In order to disperse these pigments more uniformly, they may be dispersed in a ball mill or the like as needed.

The water-soluble dyes for use in the present invention include direct dyes and acid dyes. Examples thereof include, but are not limited to, C. I. Direct Blacks 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199, C. I. Direct Violets 7, 9, 47, 48, 51, 66, 90, 93, 94, 95, 98, 100 and 101, C. I. Direct Yellows 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 144, 161 and 163, C. I. Direct Blues 1, 10, 15, 22, 25, 55, 67, 68, 71, 76, 77, 78, 80, 84, 86, 87, 90, 98, 106, 201, 202, 244, 251 and 280, C. I. Acid Blacks 7, 24, 29 and 48, C. I. Acid Violets 5, 34, 43, 47, 48, 90 and 103, C. I. Acid Yellows 17, 19, 23, 25, 39, 40, 44, 49, 50, 61, 110, 174 and 218, and C. I. Acid Blues 9, 25, 40, 41, 62, 72, 76, 80, 106, 112, 120, 205, 230, 271 and 280. The content of these dyes contained in the recording liquid is determined depending on the kind of dye, the kind of solvent component, characteristics required for the recording liquid, and the like. In general, however, it is preferably within the range of 0.2 to 40% by weight, and more preferably within the range of 0.5 to 30% by weight based on the weight of the recording liquid.

Preferred examples of water used in the present invention include ion-exchanged water, ultrapure water, distilled water and ultrafiltrated water.

In addition, pH adjustors such as potassium dihydrogenphosphate and sodium dihydrogenphosphate, and benzoic acid, dichlorophene, hexachlorophene and sorbic acid for antifungal, preservative and rust preventive purposes may be added to the recording liquid as needed. Furthermore, various general additives such as ethylene glycol and glycerine may be added to the recording liquid as needed.

The recording liquid of the present invention can be used in an image recording method comprising discharging droplets of the recording liquid from a recording head to record an image on a recording medium.

Further, the recording liquid of the present invention can be appropriately used not only for the above described ink jet recording, but also for image recording of the electrostatic attraction system and writing things.

The present invention will be described in more detail below with reference to the following Examples, but the invention should not be construed as being limited thereto.

EXAMPLE 1-1

A recording liquid was prepared as follows. Thirty-three parts by weight of an aqueous dispersion of a copper phthalocyanine pigment (Pigment Blue 15:3) (solid content: 35%), 39 parts by weight of a resin dispersion containing water and fine acrylsilicone resin particles (average particle size: 0.1 $\mu$m to 0.2 $\mu$m) having methoxysilyl groups (solid content: 35%, trade name: SW-135, manufactured by Sanyo Chemical Industries, Ltd.), and 28 parts by weight of a resin dispersion containing water and fine fluorine-containing vinyl ether resin particles (average particle size: 0.15 $\mu$m) prepared by emulsion polymerization of fluoroolefin and vinyl ether monomers (solid content: 50%, trade name: FE-3000, manufactured by Asahi Glass Co., Ltd.) were uniformly mixed by stirring. Then, the resulting mixed liquid was filtered through a membrane filter having a pore size of 10 $\mu$m to remove dust and coarse particles, to thereby obtain the recording liquid having a pigment (colorant) concentration in the recording liquid {(the pigment solid amount×100)/the total amount of the recording liquid} of 12% by weight, a pigment (colorant) concentration in the solids {(the pigment solid amount×100)/the sum of the pigment solid amount and the total amounts of fine resin particle solids} of 30% by weight, and a concentration of the total amount of the fine resin particle solids in the recording liquid {(the total amount of the fine resin particle solids× 100)/the total amount of the recording liquid} of 28% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.7.

Further, a longitudinal section of the solid image on the plain paper was observed under an optical microscope. As a result, the solid image was mainly formed on the plain paper, and no substantial penetration of the recording liquid in the plain paper was observed.

On the other hand, clogging with the recording liquid at a discharge outlet of a recording head was evaluated in the following manner. A standard injection needle having an inner diameter of 180 $\mu$m (manufactured by Iwashita Engineering Co.) was set on a tip of an injector having an inner diameter of 15 mm, and 10 ml of the recording liquid was sucked in this injector. Then, the injector was allowed to stand in a state in which dropping of the recording liquid from the needle was stopped by sealing an upper portion of the injector. After an elapse of a specified time, the upper portion was opened, and it was observed whether the recording liquid could be continuously dropped from the needle. This operation was repeated while prolonging the specified time of standing little by little, and the longest time of standing until which the recording liquid could be dropped from the needle was taken as the allowance time until development of the clogging. According to this system, the thus-measured allowance time until development of the clogging with the recording liquid was as long as 40 seconds.

Then, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Further, water was spilled on the above described solid image formed with a bar coater and the print sample obtained by use of the printer to evaluate the water resistance. As a result, blurring of the image and extension of the colorant caused by water were not observed, which proved that the recording liquid of this example had high water resistance.

EXAMPLE 1-2

Twenty-eight parts by weight of an aqueous dispersion of a copper phthalocyanine pigment (Pigment Blue 15:3) (solid content: 35%), 33 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), and 39 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 11% by weight, a pigment (colorant) concentration in the solids of 30% by weight, and a concentration of the total solids of the fine resin particles in the recording liquid of 23% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of clogging with the recording liquid was as long as 45 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-3

Thirty-two parts by weight of an aqueous dispersion of a copper phthalocyanine pigment (Pigment Blue 15:3) (solid content: 35%), 38 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), and 30 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 11% by weight, a pigment (colorant) concentration in the solids of 30% by weight, and a concentration of the total solids of the fine resin particles in the recording liquid of 27% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 40 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example was high in water resistance.

EXAMPLE 1-4

Thirty-four parts by weight of an aqueous dispersion of a copper phthalocyanine pigment (Pigment Blue 15:3) (solid content: 35%), 27 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 19 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), and 21 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 12% by weight, a pigment (colorant) concentration in the solids of 30% by weight, and a concentration of the total solids of the fine resin particles in the recording liquid of 28% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.7.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 55 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery hereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-5

Thirty-four parts by weight of an aqueous dispersion of a copper phthalocyanine pigment (Pigment Blue 15:3) (solid content: 35%), 27 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 19 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), and 31 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 11% by weight, a pigment (colorant) concentration in the solids of 30% by weight, and a concentration of the total solids of the fine resin particles in the recording liquid of 25% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 60 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-6

Thirty-four parts by weight of an aqueous dispersion of a copper phthalocyanine pigment (Pigment Blue 15:3) (solid content: 35%), 27 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 19 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), and 19 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 13% by weight, a pigment (colorant) concentration in the solids of 30% by weight, and a concentration of the total solids of the fine resin particles in the recording liquid of 28% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.7.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 55 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-7

Thirty-one parts by weight of an aqueous dispersion of a copper phthalocyanine pigment (Pigment Blue 15:3) (solid content: 35%), 24 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 28 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.) and 17 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 11% by weight, a pigment (colorant) concentration in the solids of 30% by weight, and a concentration of the total solids of the fine resin particles in the recording liquid of 25% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 60 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-8

Thirty-two parts by weight of an aqueous dispersion of a copper phthalocyanine pigment (Pigment Blue 15:3) (solid content: 35%), 19 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 13 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), 15 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.), and 22 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 11% by weight, a pigment (colorant) concentration in the solids of 30% by weight, and a concentration of the total solids of the fine resin particles in the recording liquid of 26% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm² of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 80 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-9

Thirty-one parts by weight of an aqueous dispersion of a copper phthalocyanine pigment (Pigment Blue 15:3) (solid content: 35%), 12 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 8 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), 9 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.), 14 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.), 17 parts by weight of a resin dispersion containing water and fine modified polyester resin particles having carboxyl groups at side chains (average particle size: 0.1 μm to 0.2 μm) (solid content: 25%, trade name: A-115G, different from A-215G in pH and glass transition temperature, manufactured by Takamatsu Yushi Co.), and 9 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 11% by weight, a pigment (colorant) concentration in the solids of 30% by weight, and a concentration of the total solids of the fine resin particles in the recording liquid of 25% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm² of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 110 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-10

Fourteen parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 10 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), and 11 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.) were added to 64 parts by weight of an aqueous solution of a phthalocyanine dye (Acid Blue 9) (solid content: 10%), and uniformly mixed by stirring. Then, the resulting mixed liquid was filtered through a membrane filter having a pore size of 10 μm to remove dust and coarse particles, to thereby obtain a recording liquid having a dye (colorant) concentration in the recording liquid of 6% by weight, a dye (colorant) concentration in the solids of 30% by weight, and a concentration of the total solids of the fine resin particles in the recording liquid of 15% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm$^2$ of image area showed an optical density as high as 1.8.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 60 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-11

Seven parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.), 5 parts by weight of a resin dispersion containing water and fine fluorine-containing vinyl ether resin particles, (average particle size: 0.15 μm) prepared by emulsion polymerization of fluoroolefin and vinyl ether monomers (solid content: 50%, trade name: FE-3000, manufactured by Asahi Glass Co., Ltd.), 5 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.), 8 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.), 10 parts by weight of a resin dispersion containing water and fine modified polyester resin particles having carboxyl groups at side chains (average particle size: 0.1 μm to 0.2 μm) (solid content: 25%, trade name: A-115G, manufactured by Takamatsu Yushi Co.), and 5 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.) were added to 61 parts by weight of an aqueous solution of a phthalocyanine dye (Acid Blue 9) (solid content: 10%), and uniformly mixed by stirring. Then, the resulting mixed liquid was filtered through a membrane filter having a pore size of 10 μm to remove dust and coarse particles, to thereby obtain a recording liquid having a dye (colorant) concentration in the recording liquid of 6% by weight, a dye (colorant) concentration in the solids of 30% by weight, and a concentration of the total solids of the fine resin particles in the recording liquid of 14% by weight.

The recording liquid thus prepared was applied onto plain paper for copying machines by use of a bar coater, and dried. at room temperature, to thereby obtain a solid image composed of a dry coated film on the plain paper. The optical density. of the resulting image was measured from the surface side of the image. As a result, the solid image formed by application of the recording liquid in a small amount of 0.9 mg per cm$^2$ of image area showed an optical density as high as 1.8.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 1-1. As a result, according to this system, the allowance time until development of the clogging with the recording liquid was as long as 115 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 1-12

Thirty-one parts by weight of an aqueous dispersion of a copper phthalocyanine pigment (Pigment Blue 15:3) (solid content: 35%), 43 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.), and 26 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd. were uniformly mixed by stirring. Then, the resulting mixed liquid was filtered through a membrane filter having a pore size of 11 μm to remove dust and coarse particles, to thereby obtain a recording liquid having a pigment (colorant) concentration in the recording liquid of 11% by weight, a pigment (colorant) concentration in the solids of 30% by weight, and a concentration of the total solids of the fine resin particles in the recording liquid of 26% by weight.

For the recording liquid thus prepared, the measurement of the optical density, the measurement of the allowance time until development of clogging, and the printing test on plain paper with a commercial ink jet printer were made in the same manner as in Examples 1-1 to 1-11. As a result, the allowance time until development of clogging was 40 seconds, and an original fluid of the recording liquid not diluted with water could be stably discharged by use of the commercial ink jet printer. The solid image formed by application of the recording liquid in a small amount of 0.9 mg per cm² of image area showed an optical density of 1.3.

Comparative Example 1-1

Thirty parts by weight of an aqueous dispersion of a copper phthalocyanine pigment (Pigment Blue 15:3) (solid content: 35%) and 70 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 10% by weight, a pigment (colorant) concentration in the solids of 30% by weight, and a concentration of the total solids of the fine resin particles in the recording liquid of 25% by weight.

For the recording liquid thus prepared, the measurement of the optical density, the measurement of the allowance time until development of clogging, and the printing test on plain paper with a commercial ink jet printer were made in the same manner as in Examples 1-1 to 1-11. As a result, the solid image formed by application of the recording liquid in a small amount of 0.9 mg per cm² of image area showed an optical density of 1.6. However, the allowance time until development of clogging was as short as 8 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm² of image area showed an optical density as low as 0.6.

Comparative Example 1-2

Thirty-eight parts by weight of an aqueous dispersion of a copper phthalocyanine pigment (Pigment Blue 15:3) (solid content: 35%) and 62 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 13% by weight, a pigment (colorant) concentration in the solids of 30% by weight, and a concentration of the total solids of the fine resin particles in the recording liquid of 31% by weight.

For the recording liquid thus prepared, the measurement of the optical density, the measurement of the allowance time until development of clogging, and the printing test on plain paper with a commercial ink jet printer were made in the same manner as in Examples 1-1 to 1-11. As a result, the solid image formed by application of the recording liquid in a small amount of 0.9 mg per cm² of image area showed an optical density of 1.4. However, the allowance time until development of the clogging was as short as 10 seconds. Further, as a result of the printing test with the commercial ink jet printer, clogging developed, and it was impossible to stably discharge an original fluid of the recording liquid not diluted with water.

This recording liquid was diluted 4 times with distilled water. As a result, it became dischargeable with the commercial ink jet printer. However, the solid image formed by application of the recording liquid in a small amount of 0.9 mg per cm² of image area showed an optical density as low as 0.5.

Comparative Example 1-3

Twenty-seven parts by weight of an aqueous dispersion of a copper phthalocyanine pigment (Pigment Blue 15:3) (solid content: 35%) and 73 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 9% by weight, a pigment (colorant) concentration in the solids of 30% by weight, and a concentration of the total solids of the fine resin particles in the recording liquid of 22% by weight.

For the recording liquid thus prepared, the measurement of the optical density, the measurement of the allowance time until development of clogging, and the printing test on plain paper with a commercial ink jet printer were made in the same manner as in Examples 1-1 to 1-11. As a result, the solid image formed by application of the recording liquid in a small amount of 0.9 mg per cm² of image area showed an optical density of 1.4. However, the allowance time until development of clogging was as short as 12 seconds. Further, as a result of the printing test with the commercial ink jet printer, clogging developed, and it was impossible to stably discharge an original fluid of the recording liquid not diluted with water.

This recording liquid was diluted 4 times with distilled water. As a result, it became dischargeable with the commercial ink jet printer. However, the solid image formed by application of the recording liquid in a small amount of 0.9 mg per cm² of image area showed an optical density as low as 0.5.

Comparative Example 1-4

Thirty-five parts by weight of an aqueous dispersion of a copper phthalocyanine pigment (Pigment Blue 15:3) (solid content: 35%) and 65 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 12% by weight, a pigment (colorant) concentration in the solids of 30% by weight, and a concentration of the total solids of the fine resin particles in the recording liquid of 29% by weight.

For the recording liquid thus prepared, the measurement of the optical density, the measurement of the allowance time until development of clogging, and the printing test on plain paper with a commercial ink jet printer were made in the same manner as in Examples 1-1 to 1-11. As a result, the solid image formed by application of the recording liquid in a small amount of 0.9 mg per cm² of image area showed an optical density of 1.4. However, the allowance time until development of clogging was as short as 10 seconds. Further, as a result of the printing test with the commercial ink jet printer, clogging developed, and it was impossible to stably discharge an original fluid of the recording liquid not diluted with water.

This recording liquid was diluted 4 times with distilled water. As a result, it became dischargeable with the commercial ink jet printer. However, the solid image formed by application of the recording liquid in a small amount of 0.9 mg per cm² of image area showed an optical density as low as 0.6.

Comparative Example 1-5

Thirty-seven parts by weight of an aqueous dispersion of a copper phthalocyanine pigment (Pigment Blue 15:3) (solid content: 35%) and 63 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 13% by weight, a pigment (colorant) concentration in the solid of 30% by weight, and a concentration of the total solids of the fine resin particles in the recording liquid of 31% by weight.

For the recording liquid thus prepared, the measurement of the optical density, the measurement of the allowance time until development of clogging, and the printing test on plain paper with a commercial ink jet printer were made in the same manner as in Examples 1-1 to 1-11. As a result, the solid image formed by application of the recording liquid in a small amount of 0.9 mg per cm² of image area showed an optical density of 1.3. However, the allowance time until development of clogging was as short as 10 seconds. Further, as a result of the printing test with the commercial ink jet printer, clogging developed, and it was impossible to stably discharge an original fluid of the recording liquid not diluted with water.

This recording liquid was diluted 4 times with distilled water. As a result, it became dischargeable with the commercial ink jet printer. However, the solid image formed by application of the recording liquid in a small amount of 0.9 mg per cm² of image area showed an optical density as low as 0.6.

Comparative Example 1-6

Forty parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.) was added to 60 parts by weight of an aqueous solution of a phthalocyanine dye (Acid Blue 9) (solid content: 10%), and uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 6% by weight, a pigment (colorant) concentration in the solids of 30% by weight, and a concentration of the total solids of the fine resin particles in the recording liquid of 14% by weight.

For the recording liquid thus prepared, the measurement of the optical density, the measurement of the allowance time until development of clogging, and the printing test on plain paper with a commercial ink jet printer were made in the same manner as in Examples 1-1 to 1-11. As a result, the solid image formed by application of the recording liquid in a small amount of 0.9 mg per cm² of image area showed an optical density of 1.6. However, the allowance time until development of clogging was as short as 10 seconds. Further, as a result of the printing test with the commercial ink jet printer, clogging developed, and it was impossible to stably discharge an original fluid of the recording liquid not diluted with water.

This recording liquid was diluted 4 times with distilled water. As a result, it became dischargeable with the commercial ink jet printer. However, the solid image formed by application of the recording liquid in a small amount of 0.9 mg per cm² of image area showed an optical density as low as 0.6.

Comparative Example 1-7 to 1-10

Recording liquids were prepared and tested in the same manner as in Comparative Example 1-6, except that the resin dispersion containing water and fine acrylsilicone resin particles having methoxysilyl groups was substituted by the resin dispersions used in Comparative Examples 1-2 to 1-5, respectively. As a result, in all combinations each using only one kind of fine resin particles, high optical density could not be attained compatible with the prevention of clogging.

As described above, in all the recording liquids of Examples 1-1 to 1-11, high optical density could be attained compatible with the prevention of clogging, different from Comparative Examples.

EXAMPLE 2-1

A recording liquid was prepared as follows. Twenty-two parts by weight of an aqueous dispersion of a copper phthalocyanine pigment (Pigment Blue 15:3) (solid content: 35%), 21 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), 23 parts by weight of a resin dispersion containing water and fine silicon-modified acrylic resin particles (average particle size: 0.1 μm to 0.2 μm) (solid. content: 45%, trade name: G-45, manufactured by Sanyo Chemical Industries, Ltd.), and 34 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid {(the pigment solid amount×100)/the total amount of the recording liquid} of 8% by weight, a pigment (colorant) concentration in the solids {(the pigment solid amount× 100)/the sum of the pigment solid amount and the total amount of fine resin particle solids} of 20% by weight, and a concentration of the total amount of the fine resin particle solids in the recording liquid {(the total amount of the fine resin particle solids×100)/the total amount of the recording liquid} of 31% by weight.

The recording liquid thus prepared was applied onto plain paper for copying machines by use of a bar coater, and dried at room temperature, to thereby obtain a solid image composed of a dry coated film on the plain paper. The optical density of the resulting image was measured from the surface side of the image. As a result, the solid image formed by application of the recording liquid in a small amount of 0.9 mg per cm² of image area showed an optical density as high as 1.4.

Further, a longitudinal section of the solid image on the plain paper was observed under an optical microscope. As a result, the solid image was mainly formed on the plain paper, and no substantial penetration of the recording liquid in the plain paper was observed.

On the other hand, clogging with the recording liquid at a discharge outlet of a recording head was evaluated in the following manner. A standard injection needle having an inner diameter of 180 μm (manufactured by Iwashita Engineering Co.) was set on a tip of an injector having an inner diameter of 15 mm, and 10 ml of the recording liquid was sucked in this injector. Then, the injector was allowed to stand in a state in which dropping of the recording liquid from the needle was stopped by sealing an upper portion of the injector. After an elapse of a specified time, the upper portion was opened, and it was observed whether the recording liquid could be continuously dropped from the needle. This operation was repeated while prolonging the specified time of standing little by little, and the longest time of standing until which the recording liquid could be dropped from the needle was taken as the allowance time until development of the clogging. According to this system, the thus-measured allowance time until development of the clogging with the recording liquid was as long as 50 seconds.

Then, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Further, water was spilled on the above described solid image formed with a bar coater and the print sample obtained by use of the printer to evaluate the water resistance. As a result, blurring of the image and extension of the colorant caused by water were not observed, which proved that the recording liquid of this example had high water resistance.

EXAMPLE 2-2

Twenty-two parts by weight of an aqueous dispersion of a copper phthalocyanine pigment (Pigment Blue 15:3) (solid content: 35%), 20 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), 20 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.), and 39 parts by weight of a resin dispersion containing water and fine modified polyester resin particles having carboxyl groups at side chains (average particle size: 0.1 μm to 0.2 μm) (solid content: 25%, trade name: A-115G, different from A-215G in pH and glass transition temperature, manufactured by Takamatsu Yushi Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 29% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per cm² of image area showed an optical density as high as 1.4.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 2-1. As a result, according to this system, the allowance time until development of clogging with the recording liquid was as long as 50 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 2-3

Twenty-three parts by weight of an aqueous dispersion of a copper phthalocyanine pigment (Pigment Blue 15:3) (solid content: 35%), 16 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), 18 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.), 27 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.), and 17 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 8% by weight, a pigment (colorant) concentration in the solids of 20% by weight, and a concentration of the total solids of the fine resin particles in the recording liquid of 32% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per $cm^2$ of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 2-1. As a result, according to this system, the allowance time until development of clogging with the recording liquid was as long as 100 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 2-4

Twenty parts by weight of an aqueous dispersion of a copper phthalocyanine pigment (Pigment Blue 15:3) (solid content: 35%), 14 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), 15 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.), 23 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.), and 28 parts by weight of a resin dispersion containing water and fine modified polyester resin particles having carboxyl groups at side chains (average particle size: 0.1 μm to 0.2 μm) (solid content: 25%, trade name: A-115G, manufactured by Takamatsu Yushi Co.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 28% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per $cm^2$ of image area showed an optical density as high as 1.5.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 2-1. As a result, according to this system, the allowance time until development of clogging with the recording liquid was as long as 105 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 2-5

Twenty parts by weight of an aqueous dispersion of a copper phthalocyanine pigment (Pigment Blue 15:3) (solid content: 35%), 15 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.), 14 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.), 23 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.), and 28 parts by weight of a resin dispersion containing water and fine modified polyester resin particles having carboxyl groups at side chains (average particle size: 0.1 μm to 0.2 μm) (solid content: 25%, trade name: A-115G, manufactured by Takamatsu Yushi Co.) were uniformly mixed by stirring. Then, the resulting mixed liquid was filtered through a membrane filter having a pore size of 10 µm to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 28% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per $cm^2$ of image area showed an optical density as high as 1.4.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 2-1. As a result, according to this system, the allowance time until development of clogging with the recording liquid was as long as 90 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 2-6

Twenty-one parts by weight of an aqueous dispersion of a copper phthalocyanine pigment (Pigment Blue 15:3) (solid content: 35%), 12 parts by weight of a resin dispersion containing water and fine fluorine-containing vinyl ether resin particles (average particle size: 0.15 µm) prepared by emulsion polymerization of fluoroolefin and vinyl ether monomers (solid content: 50%, trade name: FE-3000, manufactured by Asahi Glass Co., Ltd.), 13 parts by weight of a resin dispersion containing water and fine silicon-modified acrylic resin particles (average particle size: 0.1 µm to 0.2 µm) (solid content: 45%, trade name: G-45, manufactured by Sanyo Chemical Industries, Ltd.), 19 parts by weight of a resin dispersion containing water and fine modified polyester resin particles having carboxyl groups at side chains (average particle size: 0.1 µm to 0.2 µm) (solid content: 30%, trade name: A-215G, manufactured by Takamatsu Yushi Co.), 23 parts by weight of a resin dispersion containing water and fine modified polyester resin particles having carboxyl groups at side chains (average particle size: 0.1 µm to 0.2 µm) (solid content: 25%, trade name: A-115G, manufactured by Takamatsu Yushi Co.), and 12 parts by weight of a resin dispersion containing water and fine modified styrene-butadiene copolymer resin particles (average particle size: 0.19 µm) (solid content: 48.5%, trade name: SN-335, manufactured by Sumika ABS Latex Co.) were uniformly mixed by stirring. Then, the resulting mixed liquid was filtered through a membrane filter having a pore size of 10 µm to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 29% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per $cm^2$ of image area showed an optical density as high as 1.6.

Further, a longitudinal section of the solid image on the plain paper was observed under an optical microscope.. As a result, the solid image was mainly formed on the plain paper, and no substantial penetration of the recording liquid in the plain paper was observed.

Then, clogging with the recording liquid at a discharge outlet of a recording head was evaluated in the same manner as in Example 2-1. As a result, according to this system, the allowance time until development of clogging with the recording liquid was as long as 135 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled,on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 2-7

Twenty-one parts by weight of an aqueous dispersion of a copper phthalocyanine pigment (Pigment Blue 15:3) (solid content: 35%), 10 parts by weight of a resin dispersion containing water and fine fluorine-containing vinyl ether resin particles (average particle size: 0.15 µm) prepared by emulsion polymerization of fluoroolefin and vinyl ether monomers (solid content: 50%, trade name: FE-3000, manufactured by Asahi Glass Co., Ltd.), 11 parts by weight of a resin dispersion containing water and fine silicon-modified acrylic resin particles (average particle size: 0.1 µm to 0.2 µm) (solid content: 45%, trade name: G-45, manufactured by Sanyo Chemical Industries, Ltd.), 16 parts by weight of a resin dispersion containing water and fine modified polyester resin particles having carboxyl groups at side chains (average particle size: 0.1 µm to 0.2 µm) (solid content: 30%, trade name: A-215G, manufactured by Takamatsu Yushi Co.), 19 parts by weight of a resin dispersion containing water and fine modified polyester resin particles having carboxyl groups at side chains (average particle size: 0.1 µm to 0.2 µm) (solid content: 25%, trade name: A-115G, manufactured by Takamatsu Yushi Co.), 10 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.), and 14 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 29% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per $cm^2$ of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 2-1. As a result, according to this system, the allowance time until development of clogging with the recording liquid was as long as 170 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 2-8

Twenty parts by weight of an aqueous dispersion of a copper phthalocyanine pigment (Pigment Blue 15:3) (solid content: 35%), 7 parts by weight of a resin dispersion containing water and fine fluorine-containing vinyl ether resin particles (average particle size: 0.15 μm) prepared by emulsion polymerization of fluoroolefin and vinyl ether monomers (solid content: 50%, trade name: FE-3000, manufactured by Asahi Glass Co., Ltd.), 8 parts by weight of a resin dispersion containing water and fine silicon-modified acrylic resin particles (average particle size: 0.1 μm to 0.2 μm) (solid content: 45%, trade name: G-45, manufactured by Sanyo Chemical Industries, Ltd.), 12 parts by weight of a resin dispersion containing water and fine modified polyester resin particles having carboxyl groups at side chains (average particle size: 0.1 μm to 0.2 μm) (solid content: 30%, trade name: A-215G, manufactured by Takamatsu Yushi Co.), 14 parts by weight of a resin dispersion containing water and fine modified polyester resin particles having carboxyl groups at side chains (average particle size: 0.1 μm to 0.2 μm) (solid content: 25%, trade name: A-115G, manufactured by Takamatsu Yushi Co.), 12 parts by weight of a resin dispersion containing water and fine modified polyester resin particles having carboxyl groups at side chains (average particle size: 0.1 μm to 0.2 μm) (solid content: 30%, trade name: A-515G, different from A-215G and A-115G in pH and glass transition temperature, manufactured by Takamatsu Yushi Co.), 7 parts by weight of a resin dispersion containing water and fine modified styrene-butadiene copolymer resin particles (average particle size: 0.19 μm) (solid content: 48.5%, trade name: SN-335, manufactured by Sumika ABS Latex Co.), 9 parts by weight of a resin dispersion containing water and fine acrylate-silicone copolymer resin particles (average particle size: 0.16 μm) (solid content: 38.8%, trade name: ROY-6312, manufactured by Showa Highpolymer Co., Ltd.), and 10 parts by weight of a resin dispersion containing water and fine acrylsilicone resin particles (average particle size: 0.1 μm to 0.2 μm) having methoxysilyl groups (solid content: 35%, trade name: SW-135, manufactured by Sanyo Chemical Industries, Ltd.) were uniformly mixed by stirring. Then, the resulting mixed liquid was filtered through a membrane filter having a pore size of 10 μm to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 28% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per $cm^2$ of image area showed an optical density as high as 1.6.

Further, a longitudinal section of the solid image on the plain paper was observed under an optical microscope. As a result, the solid image was mainly formed on the plain paper, and no substantial penetration of the recording liquid in the plain paper was observed.

Then, clogging with the recording liquid at a discharge outlet of a recording head was evaluated in the same manner as in Example 2-1. As a result, according to this system, the allowance time until development of clogging with the recording liquid was as long as 195 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print sample obtained by use of the printer to evaluate water resistance. As a result, blurring of the image and extension of the colorant caused by water were not observed, which proved that the recording liquid of this example had high water resistance.

EXAMPLE 2-9

Six parts by weight of a resin dispersion containing water and fine fluorine-containing vinyl ether resin particles (average particle size: 0.15 µm) prepared by emulsion polymerization of fluoroolefin and vinyl ether monomers (solid content: 50%, trade name: FE-3000, manufactured by Asahi Glass Co., Ltd.), 7 parts by weight of a resin dispersion containing water and fine silicon-modified acrylic resin particles (average particle size: 0.1 µm to 0.2 µm) (solid content: 45%, trade name: G-45, manufactured by Sanyo Chemical Industries, Ltd.), 11 parts by weight of a resin dispersion containing water and fine modified polyester resin particles having carboxyl groups at side chains (average particle size: 0.1 µm to 0.2 µm) (solid content: 30%, trade name: A-215G, manufactured by Takamatsu Yushi Co.), 13 parts by weight of a resin dispersion containing water and fine modified polyester resin particles having carboxyl groups at side chains (average particle size: 0.1 µm to 0.2 µm) (solid content: 25%, trade name: A-115G, manufactured by Takamatsu Yushi Co.), 7 parts by weight of a resin dispersion containing water and fine modified styrene-butadiene copolymer resin particles (average particle size: 0.19 µm) (solid content: 48.5%, trade name: SN-335, manufactured by Sumika ABS Latex Co.), and 9 parts by weight of a resin dispersion containing water and fine acrylsilicone resin particles (average particle size: 0.1 µm to 0.2 µm) having methoxysilyl groups (solid content: 35%, trade name: SW-135, manufactured by Sanyo Chemical Industries, Ltd.) were added to 48 parts by weight of an aqueous solution of a phthalocyanine dye (Acid Blue 9) (solid content: 10%), and uniformly mixed by stirring. Then, the resulting mixed liquid was filtered through a membrane filter having a pore size of 10 µm to remove dust and coarse particles, to thereby obtain a recording. liquid having a dye (colorant) concentration in the recording liquid of 5% by weight, a dye (colorant) concentration in the solids of 20% by weight, and a concentration of the total solids of the fine resin particles in the recording liquid of 19% by weight.

The recording liquid thus prepared was applied onto plain paper for copying machines by use of a bar coater, and dried at room temperature, thereby obtaining a solid image composed of a dry coated film on the plain paper. The optical density of the resulting image was measured from the surface side of the image. As a result, the solid image formed by application of the recording liquid in a small amount of 0.9 mg per cm² of image area showed an optical density as high as 1.4.

Further, a longitudinal section of the solid image on the plain paper was observed under an optical microscope. As a result, the solid image was mainly formed on the plain paper, and no substantial penetration of the recording liquid in the plain paper was observed.

Then, clogging with the. recording liquid at a discharge outlet of a recording head was evaluated in the same manner as in Example 2-1. As a result, according to this system, the allowance time until development of clogging with the recording liquid was as long as 180 seconds.

Further, the printing test of this recording liquid on plain paper was carried out by use of a commercial ink jet printer. As a result, an original fluid of the recording liquid not diluted with water could be stably discharged. The observation of print dots of a thus-printed sample under a magnifying glass and an optical microscope revealed that the dots were distinct without blurring in the periphery thereof.

Subsequently, water was spilled on the above described solid image formed with a bar coater and the print. sample obtained by use of the printer to evaluate water resistance. As a result, blurring of the image and extension of the colorant caused by water were not observed, which proved that the recording liquid of this example had high water resistance.

EXAMPLE 2-10

Twenty-one parts by weight of an aqueous dispersion of a copper phthalocyanine pigment (Pigment Blue 15:3) (solid content: 35%), 30 parts by weight of a resin dispersion containing water and fine fluorine-containing vinyl ether resin particles (average particle size: 0.15 µm) prepared by emulsion polymerization of fluoroolefin and vinyl ether monomers (solid content: 50%, trade name: FE-3000, manufactured by Asahi Glass Co., Ltd.), and 49 parts by weight of a resin dispersion containing water and fine modified polyester resin particles having carboxyl groups at side chains (average particle size: 0.1 µm to 0.2 µm) (solid content: 30%, trade name: A-215G, manufactured by Takamatsu Yushi Co.) were uniformly mixed by stirring. Then, the resulting mixed liquid was filtered through a membrane filter having a pore size of 10 µm to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 30% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm² of image area showed an optical density of 1.4. However, the allowance time until development of clogging was 20 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm² of image area showed an optical density of 0.4.

EXAMPLE 2-11

Nineteen parts by weight of an aqueous dispersion of a copper phthalocyanine pigment (Pigment Blue 15:3) (solid content: 35%), 30 parts by weight of a resin dispersion containing water and fine fluorine-containing vinyl ether resin particles (average particle size: 0.15 µm) prepared by emulsion polymerization of fluoroolefin and vinyl ether monomers (solid content: 50%, trade name: FE-3000, manufactured by Asahi Glass Co., Ltd.), and 54 parts by weight of a resin dispersion containing water and fine modified polyester resin particles having carboxyl groups at side chains (average particle size: 0.1 µm to 0.2 µm) (solid content: 25%, trade name: A-115G, manufactured by Takamatsu Yushi Co.) were uniformly mixed by stirring. Then, the resulting mixed liquid was filtered through a membrane filter having a pore size of 10 µm to remove dust and coarse particles, to thereby obtain a recording liquid having a pigment colorant) concentration in the recording liquid of 7% by weight, a pigment (colorant) concentration in the solids of 20% by weight, and a concentration of the total solids of the fine resin particles in the recording liquid of 27% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.4. However, the allowance time until development of clogging was 20 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per. cm$^2$ of image area showed an optical density of 0.4.

EXAMPLE 2-12

Twenty-one parts by weight of an aqueous dispersion of d copper phthalocyanine pigment (Pigment Blue 15:3) (solid content: 35%), 30 parts by weight of a resin dispersion containing water and fine modified styrene-butadiene copolymer resin particles (average particle size: 0.19 $\mu$m) (solid content: 48.5%, trade name: SN-335, manufactured by Sumika ABS Latex Co.), and 49 parts by weight of a resin dispersion containing water and fine modified polyester resin particles having carboxyl groups at side chains (average particle size: 0.1 $\mu$m to 0.2 $\mu$m) (solid content: 30%, trade name: A-215G, manufactured by Takamatsu Yushi Co.) were uniformly mixed by stirring. Then, the resulting mixed liquid was filtered through a membrane filter having a pore size of 10 $\mu$m to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 29% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.4. However, the allowance time until development of clogging was 18 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm$^2$ of image area showed an optical density of 0.4.

EXAMPLE 2-13

Nineteen parts by weight of an aqueous dispersion of a copper phthalocyanine pigment (Pigment Blue 15:3) (solid content: 35%), 30 parts by weight of a resin dispersion containing water and fine modified polyester resin particles having carboxyl groups at side chains (average particle size: 0.1 $\mu$m to 0.2 $\mu$m) (solid content: 30%, trade name: A-215G, manufactured by Takamatsu Yushi Co.), and 54 parts by weight of a resin dispersion containing water and fine modified polyester resin particles having carboxyl groups at side chains (average particle size: 0.1 $\mu$m to 0.2 $\mu$m) (solid content: 25%, trade name: A-115G, manufactured by Takamatsu Yushi Co.) were uniformly mixed by stirring. Then, the resulting mixed liquid was filtered through a membrane filter having a pore size of 10 $\mu$m to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 27% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.3. However, the allowance time until development of clogging was 20 seconds. Further, as. a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm$^2$ of image area showed an optical density of 0.3.

EXAMPLE 2-14

Nineteen parts by weight of a resin dispersion containing water and fine fluorine-containing vinyl ether resin particles (average particle size: 0.15 $\mu$m) prepared by emulsion polymerization of fluoroolefin and vinyl ether monomers (solid content: 50%, trade name: FE-3000, manufactured by Asahi Glass Co., Ltd.), and 32 parts by weight of a resin dispersion containing water and fine modified polyester resin particles having carboxyl groups at side chains (average particle size: 0.1 $\mu$m to 0.2 $\mu$m) (solid content: 30%, trade name: A-215G, manufactured by Takamatsu Yushi Co.) was added to 48 parts by weight of an aqueous solution of a phthalocyanine dye (Acid Blue 9) (solid content: 10%), and uniformly mixed by stirring. Then, the resulting mixed liquid was filtered through a membrane filter having a pore size of 10 $\mu$m to remove dust and coarse particles, to thereby obtain a recording liquid having a dye (colorant) concentration in the recording liquid of 5% by weight, a dye (colorant) concentration in the solids of 20% by weight, and a concentration of the total solids of the fine resin particles in the recording liquid of 19% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.4. However, the allowance time until development of clogging was 22 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per $cm^2$ of image area showed an optical density of 0.3.

EXAMPLE 2-15

A recording liquid was prepared and tested in the same manner as in Example 2-14, except that the resin dispersion containing water and fine modified polyester resin particles having carboxyl groups at side chains (trade name: A-215G, manufactured by Takamatsu Yushi Co.) was substituted by a resin dispersion containing water and fine modified polyester resin particles having carboxyl groups at side chains (average particle size: 0.1 µm to 0.2 µm) (solid content: 25%, trade name: A-115G, manufactured by Takamatsu Yushi Co.). As a result, high optical density could not attained compatible with the prevention of clogging.

EXAMPLE 2-16

A recording liquid was prepared and tested in the same manner as in Example 2-14, except that the resin dispersion containing water and fine fluorine-containing vinyl ether resin particles prepared by emulsion polymerization of fluoroolefin and vinyl ether monomers was substituted by a resin dispersion containing water and fine modified styrene-butadiene copolymer resin particles (average particle size: 0.19 µm) (solid content: 48.5%, trade name: SN-335, manufactured by Sumika ABS Latex Co.). As a result, high optical density could not be attained compatible with the prevention of clogging.

EXAMPLE 2-17

A recording liquid was prepared and tested in the same manner as in Example 14, except that the resin dispersion. containing water and fine fluorine-containing vinyl ether resin particles prepared by emulsion polymerization of fluoroolefin and vinyl ether monomers was substituted by a resin dispersion containing water and fine modified polyester resin particles having carboxyl groups at side chains (average particle size: 0.1 µm to 0.2 µm) (solid content: 30%, trade name: A-215G, manufactured by Takamatsu Yushi Co.), and that the resin dispersion containing water and fine modified polyester resin particles having carboxyl groups at side chains (trade name: A-215G, manufactured by Takamatsu Yushi Co.) was substituted by a resin dispersion containing water and fine modified polyester resin particles having carboxyl groups at side chains (average particle size: 0.1 µm to 0.2 µm) (solid content: 25%, trade name: A-115G, manufactured by Takamatsu Yushi Co.). As a result, high optical density could not be attained compatible with the prevention of clogging.

Comparative Example 2-1

Twenty-six parts by weight of an aqueous dispersion of a copper phthalocyanine pigment (Pigment Blue 15:3) (solid content: 35%), and 74 parts by weight of a resin dispersion containing water and fine fluorine-containing vinyl ether resin particles (average particle size: 0.15 µm) prepared by emulsion polymerization of fluoroolefin and vinyl ether monomers (solid content: 50%, trade name: FE-3000, manufactured by Asahi Glass Co., Ltd.) were uniformly mixed by stirring. Then, the resulting mixed liquid was filtered through a membrane filter having a pore size of 10 µm to remove dust and coarse particles, to thereby obtain a recording liquid having a pigment (colorant) concentration in the recording liquid of 9% by weight, a pigment (colorant) concentration in the solids of 20% by weight, and a concentration of the total solids of the fine resin particles in the recording liquid of 37% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per $cm^2$ of image area showed an optical density of 1.4. However, the allowance time until development of clogging was as short as 8 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per $cm^2$ of image area showed an optical density as low as 0.4.

Comparative Example 2-2

Twenty-four parts by weight of an aqueous dispersion of a copper phthalocyanine pigment (Pigment Blue 15:3) (solid content: 35%), and 76 parts by weight of a resin dispersion containing water and fine silicon-modified acrylic resin particles (average particle size: 0.1 µm to 0.2 µm) (solid content: 45%, trade name: G-45, manufactured by Sanyo Chemical Industries, Ltd.) were uniformly mixed by stirring. Then, the resulting mixed liquid was filtered through a membrane filter having a pore size of 10 µm to remove dust and coarse particles, to thereby obtain a recording liquid having a pigment (colorant) concentration in the recording liquid of 9% by weight, a pigment (colorant) concentration in the solids of 20% by weight, and a concentration of the total solids of the fine resin particles in the recording liquid of 34% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per $cm^2$ of image area showed an optical density of 1.3. However, the allowance time until development of clogging was as short as 10 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per $cm^2$ of image area showed an optical density as low as 0.4.

Comparative Example 2-3

Eighteen parts by weight of an aqueous dispersion of a copper phthalocyanine pigment (Pigment Blue 15:3) (solid content: 35%), and 82 parts by weight of a resin dispersion containing water and fine modified polyester resin particles having carboxyl groups at side chains (average particle size: 0.1 $\mu$m to 0.2 $\mu$m) (solid content: 30%, trade name: A-215G, manufactured by Takamatsu Yushi Co.) were uniformly mixed by stirring. Then, the resulting mixed liquid was filtered through a membrane filter having a pore size of 10 $\mu$m to. remove dust and coarse particles, to thereby obtain a recording liquid having a pigment (colorant) concentration in the recording liquid of 6% by weight, a pigment (colorant) concentration in the solids of 20% by weight, and a concentration of the total solids of the fine resin particles in the recording liquid of 25% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.2. However, the allowance time until development of clogging was as short as 10 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm$^2$ of image area showed an optical density as low as 0.4.

Comparative Example 2-4

Twenty-six parts by weight of an aqueous dispersion of a copper phthalocyanine pigment (Pigment Blue 15:3) (solid content: 35%), and 74 parts by weight of a resin dispersion containing water and fine modified styrene-butadiene copolymer resin particles (average particle size: 0.19 $\mu$m) (solid content: 48.5%, trade name: SN-335, manufactured by Sumika ABS Latex Co.) were uniformly mixed by stirring. Then, the resulting mixed liquid was filtered through a membrane filter having a pore size of 10 $\mu$m to remove dust and coarse particles, to thereby obtain a recording liquid having a pigment (colorant) concentration in the recording liquid of 9% by weight, a pigment (colorant) concentration in the solids of 20% by weight, and a concentration of the total solids of the fine resin particles in the recording liquid of 36% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.4. However, the allowance time until development of clogging was as short as 8 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm$^2$ of image area showed an optical density as low as 0.4.

Comparative Example 2-5

Fifteen parts by weight of an aqueous dispersion of a copper phthalocyanine pigment (Pigment Blue 15:3) (solid content: 35%), and 85 parts by weight of a resin dispersion containing water and fine modified polyester resin particles having carboxyl groups at side chains (average particle size: 0.1 $\mu$m to 0.2 $\mu$m) (solid content: 25%, trade name: A-115G, manufactured by Takamatsu Yushi Co.) were uniformly mixed by stirring. Then, the resulting mixed liquid was filtered through a membrane filter having a pore size of 10 $\mu$m to remove dust and coarse particles, to thereby obtain a recording liquid having a pigment (colorant) concentration in the recording liquid of 5% by weight, a pigment (colorant) concentration in the solids of 20% by weight, and a concentration of the total solids of the fine resin particles in the recording liquid of 21% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.2. However, the allowance time until development of clogging was as short as 10 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm$^2$ of image area showed an optical density as low as 0.4.

Comparative Example 2-6

Twenty parts by weight of an aqueous dispersion of a copper phthalocyanine pigment (Pigment Blue 15:3) (solid content: 35%), and 80 parts by weight of a resin dispersion containing water and fine acrylsilicone resin particles (average particle size: 0.1 $\mu$m to 0.2 $\mu$m) having methoxysilyl groups (solid content: 35%, trade name: SW-135, manufactured by Sanyo Chemical Industries, Ltd.) were uniformly mixed by stirring. Then, the resulting mixed liquid was filtered through a membrane filter having a pore size of 10 $\mu$m to remove dust and coarse particles, to thereby obtain a recording liquid having a pigment (colorant) concentration in the recording liquid of 7% by weight, a pigment (colorant) concentration in the solids of 20% by weight, and a concentration of the total solids of the fine resin particles in the recording liquid of 28% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm$^2$ of image area showed an optical density of 1.4. However, the allowance time until development of clogging was as short as 7 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm² of image area showed an optical density as low as 0.5.

Comparative Example 2-7

Forty-four parts by weight of a resin dispersion containing water and fine fluorine-containing vinyl ether resin particles (average particle size: 0.15 µm) prepared by emulsion polymerization of fluoroolefin and vinyl ether monomers (solid content: 50%, trade name: FE-3000, manufactured by Asahi Glass Co., Ltd.) was added to 56 parts by weight of an aqueous solution of a phthalocyanine dye (Acid Blue 9) (solid content: 10%), and uniformly mixed by stirring. Then, the resulting mixed liquid was filtered through a membrane filter having a pore size of 10 µm to remove dust and coarse particles, to thereby obtain a recording liquid having a dye (colorant) concentration in the recording liquid of 6% by weight, a dye (colorant) concentration in the solids of 20% by weight, and a concentration of the total solids of the fine resin particles in the recording liquid of 22% by weight.

For the recording liquid thus prepared, the measurement of the optical density, the measurement of the allowance time until development of clogging, and the printing test on plain paper with a commercial ink jet printer were made in the same manner as in Examples 2-1 to 2-9. As a result, the solid image formed by application of the recording liquid in a small amount of 0.9 mg per cm² of image area showed an optical density of 1.4. However, the allowance time until development of clogging was as short as 10 seconds. Further, as a result of the printing test with the commercial ink jet printer, clogging developed, and it was impossible to stably discharge an original fluid of the recording liquid not diluted with water.

This recording liquid was diluted 4 times (recording liquid:water=1:3) with distilled water. As a result, it became dischargeable with the commercial ink jet printer. However, the solid image formed by application of the recording liquid in a small amount of 0.9 mg per cm² of image area showed an optical density as low as 0.3.

Comparative Example 2-8 to 2-12

Recording liquids were prepared and tested in the same manner as in Comparative Example 2-7, except that the resin dispersion containing fine fluorine-containing vinyl ether resin particles prepared by emulsion polymerization of fluoroolefin and vinyl ether monomers was substituted by the resin dispersions used in Comparative Examples 2-2 to 2-6, respectively. As a result, in all combinations each using only one kind of fine resin particles, high optical density could not be attained compatible with the prevention of clogging.

As demonstrated above, the recording liquid of the present invention provides an image having high image density, exhibiting no blurring on recording paper and no penetration therein, and excellent in water resistance, and has excellent discharge stability.

While the invention has been described in detail and with reference to specific examples thereof, it will be apparent to one skilled in the art that various changes and modifications can be made therein without departing from spirit and scope thereof.

What is claimed is:

1. An image recording method comprising discharging droplets of a recording ink from discharge outlet sections of a recording head and placing the ink droplets on a recording medium to form an image thereon, said recording ink comprising a colorant, water and at least two kinds of resin particles each having an average particle size of from 0.01 µm to 5 µm, wherein at least one of said at least two kinds of resin particles are self-crosslinkable resin particles.

2. The image recording method according to claim 1, wherein the number of the kinds of said resin particles is 3 or more.

3. The image recording method according to claim 1, wherein the number of the kinds of said resin particles is 4 or more.

4. The image recording method according to claim 1, wherein said recording medium is plain paper.

5. The image recording method according to claim 1, wherein the droplets are discharged from ink jet nozzles, and wherein said at least two kinds of resin particles comprise first resin particles and a sufficient amount of second resin particles for reducing agglomeration of the first resin particles and the second resin particles in the nozzles.

6. The image recording method according to claim 5, wherein the first resin particles and the second resin particles are totally introduced in the water in amounts sufficient to increase the water-repellency of the colorant.

7. The image recording method according to claim 1, wherein said ink contains non-crosslinkable resin particles.

8. The image recording method according to claim 1, wherein said self-crosslinkable resin particles are acrylsilicone resin particles.

9. The image recording method according to claim 8, wherein said acrylsilicone resin particles contain an alkoxysilyl group.

10. The image recording method according to claim 7, wherein said non-crosslinkable resin particles are fluororesin particles.

11. The image recording method according to claim 10, wherein said fluororesin particles have fluoroolefin units.

12. The image recording method according to claim 1, wherein the total content of said resin particles in the recording ink is from 10 to 95% by weight.

13. The image recording method according to claim 1, wherein said colorant is a pigment.

14. The image recording method according to claim 13, wherein the content of said pigment in the recording ink is from 1 to 50% by weight.

15. The image recording method according to claim 1, wherein said colorant is a dye.

16. The image recording method according to claim 15, wherein the content of said dye in the recording ink is from 0.2 to 40% by weight.

* * * * *